United States Patent [19]
Kikuchi

[11] Patent Number: 5,221,996
[45] Date of Patent: Jun. 22, 1993

[54] ZOOM LENS SYSTEM HAVING SHORT TOTAL LENGTH

[75] Inventor: Juro Kikuchi, Yamanashi, Japan

[73] Assignee: Olympus Optical Co., Ltd., Tokyo, Japan

[21] Appl. No.: 763,462

[22] Filed: Sep. 20, 1991

[30] Foreign Application Priority Data

Sep. 21, 1990 [JP] Japan ............................. 2-250084
May 14, 1991 [JP] Japan ............................. 3-137050

[51] Int. Cl.⁵ .......................................... G02B 15/14
[52] U.S. Cl. ................................. 359/690; 359/654; 359/687
[58] Field of Search ................. 359/688, 687, 652–654, 359/690

Primary Examiner—Scott J. Sugarman
Attorney, Agent, or Firm—Cushman, Darby & Cushman

[57] ABSTRACT

A zoom lens system comprising at least a first lens unit having a positive refractive power as a whole, a second lens unit having a negative refractive power as a whole and a third lens unit having a positive refractive power as a whole, and adapted to perform variation of focal length by varying at least two airspaces reserved between said lens units. This zoom lens system consists of a small number of lens elements, has a short total length and a compact external design, and is light in weight.

15 Claims, 13 Drawing Sheets

ZOOM LENS SYSTEM HAVING SHORT TOTAL LENGTH

BACKGROUND OF THE INVENTION

1. Field of the Invention

The present invention relates to a zoom lens system for photographic cameras, and more specifically to a zoom lens system suited for use with photographic cameras which use solid-state image pickup devices as image sensors.

2. Description of the Prior Art

Most of the lens systems which are adopted for use with cameras using electronic image pickup tubes or solid-state image pickup devices as image sensors are designed as zoom lens systems, as exemplified by the lens systems disclosed by Japanese Patent Kokai Publication No. Sho 62-247318 and No. Sho 63-287810. Each of these zoom lens systems comprises, in the order from the object side, a first positive lens unit, a second negative lens unit, a third positive lens unit and a fourth positive lens unit, and adapted to move the second lens unit and the third lens unit for variation of focal length. These zoom lens systems have compositions consisting of small numbers of lens elements, compact external designs and high zooming ratios exceeding 3. Especially, the zoom lens system disclosed by Japanese Patent Kokai Publication No. Sho 63-287810 has a high aperture ratio exceeding F/2.8, and a long back focal length whose optical path length is 1.05 times as long as a geometrical mean $f_s$ of the focal lengths of the zoom lens system as a whole at the wide position and that at the tele position.

Further, the zoom lens system disclosed by Japanese Patent Kokai Publication No. Hei 2-236514 has a long back focal length whose optical path length $f_B$ is longer than 1.2 times of the focal length $f_s$ for allowing to arrange a quick return mirror which is used to branch an optical path of a finder system from the optical path of the photographic system, a composition consisting of a small number of lens elements, a field angle of approximately 48° at the wide position, a vari-focal ratio of approximately 3, an aperture ratio of approximately f/2.8, a total length of approximately 4.5 $f_s$, an effective diameter of a front lens component of approximately 1.55 $f_s$. That is to say, the zoom lens system disclosed by Japanese Patent Kokai Publication No. Hei 2-236514 is compact in external design thereof, light in weight, manufacturable at a low cost and high in optical performance.

However, the conventional examples of zoom lens systems mentioned above have the defects described below. The zoom lens system disclosed by Japanese Patent Kokai Publication No. Sho 63-287810 uses a thick positive lens component in a fourth lens unit comprised therein and has a long total length.

Further, each of the lens systems disclosed by Japanese Patent Kokai Publication No. Sho 62-247318 and Japanese Patent Kokai Publication No. Hei 2-236514 uses a thick negative lens component and has a long total length.

All of the conventional examples of zoom lens systems described above are long in the total lengths thereof and low in portability.

SUMMARY OF THE INVENTION

A primary object of the present invention is to provide a zoom lens system which has a back focal length shortened by thinning the lens component corresponding to the negative lens component used in the fourth lens unit of the conventional zoom lens system and a total length shortened by preventing the exit pupil from being located close to the image surface.

The zoom lens system according to the present invention comprises at least a first lens unit having a positive refractive power as a whole, a second lens unit having a negative refractive power as a whole, and a final lens unit which consists of a positive lens component arranged on the object side, a negative lens component having a concave diverging surface on the object side and a positive lens component arranged on the image side, said zoom lens system being adapted to perform variation of focal length by varying at least two airspaces. The positive lens component arranged on the image side in said final lens unit is designed as a radial graded refractive index lens component (radial GRIN lens component) which has refractive index lowered as the portions of said lens component are farther from the optical axis, satisfies the following conditions (1) and (2), and has a refractive index distribution profile expressed by the formula shown below:

$$h_6/h_4 < -10 \tag{1}$$

$$h_8/h_4 > 10^3 \tag{2}$$

$$n^2(s) = n_0^2\{1 - (gs)^2 + h_4(gs)^4 + h_6(gs)^6 + h_8(gs)^8\}$$

wherein the reference symbol s represents the distance as measured from the optical axis to a portion of interest on said GRIN lens component, the reference symbol n(s) designates the refractive index of the portion located at the distance s as measured from the optical axis, and the reference symbols g, $h_4$, $h_6$ and $h_8$ denote the refractive index distribution coefficients. p The zoom lens system according to the present invention has the composition described above and uses the radial GRIN lens component as the positive lens component arranged on the image side in the final lens unit for correcting the coma which is aggravated at high image heights by thinning the lens component having the concave diverging surface in the final lens unit. Owing to the design described above, the present invention has succeeded in shortening the total length of the zoom lens system without degrading the optical performance thereof.

Further, it is possible and desirable to reserve a certain definite distance between the image surface and the exit pupil, even when the total length of the zoom lens system is shortened, by widening the airspace reserved between the positive lens component arranged on the object side of the negative lens component arranged in the final lens unit and the concave diverging surface of said negative lens component, and strengthening the refractive power of the positive lens component arranged on the image side.

In order to correct aberrations mainly at the high image heights, it is necessary that the radial GRIN lens component has such a shape as to abruptly vary refractive index as the portions of this lens component are farther from the optical axis. For this purpose, values of $h_6$ and $h_8$ must be large as compared with the value of $h_4$ in the formula of refractive index distribution profile mentioned above.

For this reason, the refractive index distribution coefficients for the radial GRIN lens component used in the zoom lens system according to the present invention are selected so that $h_4$ and $h_6$ have values of different signs, whereas $h_4$ and $h_8$ have values of the same sign.

In the fundamental composition, the zoom lens system according to the present invention comprises at least the first lens unit having the positive refractive power as a whole, the second lens unit having the negative refractive power as a whole and the final lens unit having the positive refractive power, and is adapted to perform zooming by varying at least two airspaces reserved between the lens units.

Speaking concretely, the zoom lens system according to the present invention can have, for example, the composition described below.

The zoom lens system according to the present invention may be composed of a first lens unit having a positive refractive power as a whole, a second lens unit having a negative refractive power as a whole and a third lens unit (final lens unit) having a positive refractive power as a whole so that the second lens unit is moved for variation of focal length of the zoom lens system. In this composition, the third lens unit used as the final lens unit is composed of a positive lens component, a lens component having a concave diverging surface on the object side and a positive lens component which is designed as a graded refractive index lens component.

In the composition described above, the third lens unit is also moved along the optical axis for variation of focal length while keeping the first lens unit stationary or the first lens unit is also moved along the optical axis for variation of focal length while keeping the third lens unit stationary. In other words, the second lens unit and the third lens unit function as the variator and the compensator respectively or the first lens unit and the second lens unit function as the variator and the compensator in the zoom lens system according to the present invention when it has the composition described above.

Furthermore, the zoom lens system according to the present invention may have another concrete composition. Speaking concretely, the zoom lens system according to the present invention may be composed of a first lens unit having a positive refractive power as a whole, a second lens unit having a negative refractive power as a whole, a third lens unit having a positive refractive power as a whole and a fourth lens unit having a positive refractive power as a whole so that focal length of the zoom lens system can be varied by moving the second lens unit and the third lens unit along the optical axis, and the second lens unit and the third lens unit function as the variator and the compensator respectively. When the zoom lens system according to the present invention has this composition the fourth lens unit adopted as the final lens unit has the composition which is the same as that of the final lens unit used in the composition already described above and the positive lens component arranged on the image side in the fourth lens unit is designed as a graded refractive index lens component.

In the zoom lens system which is composed of the four lens units, it is possible to move the second lens unit and the third lens unit integrally along the optical axis. In such a case, the zoom lens system composed of the four lens units is substantially the same as the zoom lens system composed of the three lens units.

As is understood from the foregoing description, the zoom lens system according to the present invention is characterized in that the final lens unit has the positive refractive power as a whole, that the final lens unit is composed, in the order from the object side, the positive lens component, the lens component having the concave diverging surface on the object side and the positive lens component, and that the lens component arranged on the image side is designed as the graded refractive index lens component.

Accordingly, composition of the zoom lens system according to the present invention is not limited to the concrete compositions described above. In other words, the zoom lens system according to the present invention may be composed of a plurality of lens units including a final one having the above-described composition (consisting of the positive lens component, the lens component having the concave diverging surface on the object side and the positive lens component), and can perform the variation of focal length by varying at least two air-spaces reserved between the lens units.

The above-mentioned conditions (1) and (2) are important for a GRIN lens component having a low gradient of refractive index distribution, and is required for a small absolute value $|\Delta n|$ (0.05 or smaller) of the difference between the refractive index as measured at the end of the effective diameter of the GRIN lens component and the refractive index thereof as measured on the optical axis. It is therefore desirable that $|\Delta n|$ satisfies the following condition (3):

$$|\Delta n| < 0.05 \qquad (3)$$

If the condition (3) is not satisfied or $|\Delta n|$ exceeds 0.05, the conditions (1) and (2) need not necessarily be satisfied.

Under the current circumstance, materials for manufacturing radial GRIN lens components which have effective diameters large enough for use in the zoom lens system according to the present invention can be prepared more hardly as they have larger values of $|\Delta n|$. Therefore, the conditions (1) and (2) which are effective for small value of $|\Delta n|$ are important from the viewpoint of practice.

It is desirable that $\Delta n$ satisfies the following condition (4):

$$\Delta n < 0 \qquad (4)$$

The condition (4) defines that refractive index of the GRIN lens component is lowered as the portions of said GRIN lens component are farther from the optical axis toward the margin.

Under the current circumstance, it is difficult to prepare a material for a GRIN lens component whose refractive index is enhanced as the portions of said GRIN lens component are farther from the optical axis toward the margin. Accordingly, it is desirable to use a material which has refractive index lowered from the optical axis toward the margin.

Further, let us consider as a boundary the diverging surface which is arranged on the object side and concave toward the object side out of the concave surfaces located in the final lens unit, designate the thickness of the airspace located on the object side of said boundary as a, denote the thickness of the lens element arranged on the image side of said diverging surface as b and represent the refractive index of this lens element as $n_b$. Then, it is desirable to design the final lens unit so as to satisfy the following condition (5):

$$0.1 < (b/n_b)/\{a+(b/n_b)\} < 0.61 \quad (5)$$

If the upper limit of the condition (5) is exceeded, the lens element which has the concave diverging surface on the object side will be too thick thereby undesirably prolonging the total length of the zoom lens system. If the lower limit of the condition (5) is exceeded, in contrast, it will be impossible to form a diverging surface which is capable of correcting aberrations sufficiently.

DETAILED DESCRIPTION OF THE PREFERRED EMBODIMENTS

Figure 1:
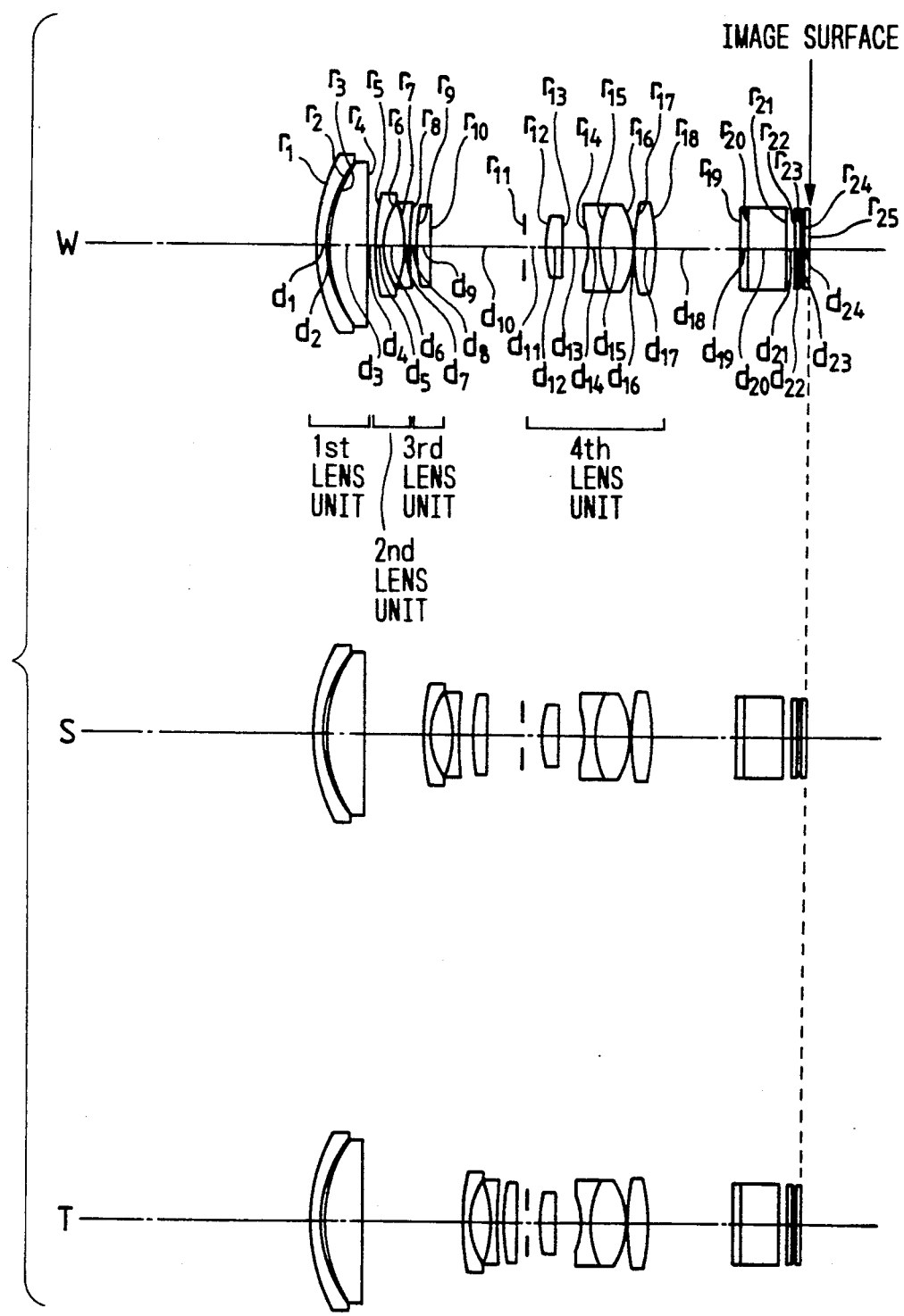
FIG. 1 through FIG. 5 show sectional views illustrating compositions of Embodiments 1 through 5 respectively of the zoom lens system according to the present invention.

Now, the zoom lens system according to the present invention will be described more detailed below with reference to the preferred embodiments illustrated in the accompanying drawings and given in the form of the following numerical data:

Embodiment 1

$f = 10.3 \sim 26.2$, F/2.7, $2\omega = 44.3° \sim 18.2°$
$r_1 = 22.98$
$\quad d_1 = 1.5 \quad n_1 = 1.84666 \quad \nu_1 = 23.8$
$r_2 = 16.51$
$\quad d_2 = 0.3$
$r_3 = 17.82$
$\quad d_3 = 4.7 \quad n_2 = 1.72916 \quad \nu_2 = 54.7$
$r_4 = \infty$
$\quad d_4 = D_1 \text{ (variable)}$ -continued $r_5 = 37.70$
$\quad d_5 = 0.9 \quad n_3 = 1.6968 \quad \nu_3 = 56.5$
$r_6 = 8.99$
$\quad d_6 = 2.6$
$r_7 = -13.89$
$\quad d_7 = 0.8 \quad n_4 = 1.617 \quad \nu_4 = 62.8$
$r_8 = 52.30$
$\quad d_8 = D_2 \text{ (variable)}$
$r_9 = 26.90$
$\quad d_9 = 1.7 \quad n_5 = 1.84666 \quad \nu_5 = 23.8$
$r_{10} = \infty$
$\quad d_{10} = D_3 \text{ (variable)}$
$r_{11} = \text{stop}$
$\quad d_{11} = 1.8$
$r_{12} = 15$
$\quad d_{12} = 2.0 \quad n_6 = 1.883 \quad \nu_6 = 40.8$
$r_{13} = -1860$
$\quad d_{13} = 3.3$
$r_{14} = -9.87$
$\quad d_{14} = 1.3 \quad n_7 = 1.80518 \quad \nu_7 = 25.4$
$r_{15} = 11.16$
$\quad d_{15} = 4.3 \quad n_8 = 1.60562 \quad \nu_8 = 43.7$
$r_{16} = -10.17$
$\quad d_{16} = 0.2$
$r_{17} = 26.02$
$\quad d_{17} = 2.5 \quad n_9 = \text{radial GRIN lens}$
$r_{18} = -24.64$
$\quad d_{18} = 10.6$
$r_{19} = \infty$
$\quad d_{19} = 1.0 \quad n_{10} = 1.51633 \quad \nu_{10} = 64.2$
$r_{20} = \infty$
$\quad d_{20} = 4.8 \quad n_{11} = 1.54771 \quad \nu_{11} = 62.8$
$r_{21} = \infty$
$\quad d_{21} = 1.0$
$r_{22} = \infty$
$\quad d_{22} = 0.7 \quad n_{12} = 1.51633 \quad \nu_{12} = 64.2$
$r_{23} = \infty$
$\quad d_{23} = 0.3$
$r_{24} = \infty$
$\quad d_{24} = 0.6 \quad n_{13} = 1.48749 \quad \nu_{13} = 70.2$
$r_{25} = \infty$

| f | 10.3 | 16.4 | 26.2 |
|---|---|---|---|
| $D_1$ | 1.00 | 7.46 | 12.74 |
| $D_2$ | 0.85 | 1.78 | 0.81 |
| $D_3$ | 12.70 | 5.31 | 1.00 |
| fB | 16.58 | 16.58 | 16.58 |
| total length | 58.94 | 58.94 | 58.94 |

$$\text{total length} = \sum_{i=1}^{17} d_i + f_B$$

radial GRIN lens

| | $n_0$ | g | $h_4$ |
|---|---|---|---|
| d line | 1.59468 | $0.26680 \times 10^{-1}$ | $-0.98948 \times 10$ |
| C line | 1.59055 | $0.26553 \times 10^{-1}$ | $-0.99920 \times 10$ |
| F line | 1.60409 | $0.26784 \times 10^{-1}$ | $-0.98164 \times 10$ |

| | $h_6$ | $h_8$ |
|---|---|---|
| d line | $0.84248 \times 10^3$ | $-0.41693 \times 10^5$ |
| C line | $0.85865 \times 10^3$ | $-0.42899 \times 10^5$ |
| F line | $0.82955 \times 10^3$ | $-0.40737 \times 10^5$ |

$h_6/h_4 = -85.14$, $h_8/h_4 = 4213.63$,
$\Delta n = -0.016319$ (effective diameter 10 mm)
$(b/n_b)/\{a + (b/n_b)\} = 0.180$ Embodiment 2

$f = 10.3 \sim 26.2$, F/2.7, $2\omega = 44.3° \sim 18.2°$
$r_1 = 22.98$
$\quad d_1 = 1.5 \quad n_1 = 1.84666 \quad \nu_1 = 23.8$
$r_2 = 16.51$
$\quad d_2 = 0.3$
$r_3 = 17.82$
$\quad d_3 = 4.7 \quad n_2 = 1.72916 \quad \nu_2 = 54.7$
$r_4 = \infty$
$\quad d_4 = D_1 \text{ (variable)}$
$r_5 = 37.70$
$\quad d_5 = 0.9 \quad n_3 = 1.6968 \quad \nu_3 = 56.5$
$r_6 = 8.99$
$\quad d_6 = 2.6$
$r_7 = -13.89$
$\quad d_7 = 0.8 \quad n_4 = 1.617 \quad \nu_4 = 62.8$ -continued

| | | | |
|---|---|---|---|
| $r_8 = 52.30$ | | | |
| $d_8 = D_2$ (variable) | | | |
| $r_9 = 26.90$ | | | |
| $d_9 = 1.7$ | $n_5 = 1.84666$ | $\nu_5 = 23.8$ | |
| $r_{10} = \infty$ | | | |
| $d_{10} = D_3$ (variable) | | | |
| $r_{11} =$ stop | | | |
| $d_{11} = 1.8$ | | | |
| $r_{12} = 12.07$ | | | |
| $d_{12} = 1.4$ | $n_6 =$ radial GRIN lens 1 | | |
| $r_{13} = -91.83$ | | | |
| $d_{13} = 3.3$ | | | |
| $r_{14} = -11.07$ | | | |
| $d_{14} = 1.4$ | $n_7 = 1.80518$ | $\nu_7 = 25.4$ | |
| $r_{15} = 11.37$ | | | |
| $d_{15} = 3.9$ | $n_8 = 1.60562$ | $\nu_8 = 43.7$ | |
| $r_{16} = -9.76$ | | | |
| $d_{16} = 0.2$ | | | |
| $r_{17} = 27.93$ | | | |
| $d_{17} = 2.2$ | $n_9 =$ radial GRIN lens 2 | | |
| $r_{18} = -27.38$ | | | |
| $d_{18} = 10.4$ | | | |
| $r_{19} = \infty$ | | | |
| $d_{19} = 1.0$ | $n_{10} = 1.51633$ | $\nu_{10} = 64.2$ | |
| $r_{20} = \infty$ | | | |
| $d_{20} = 4.8$ | $n_{11} = 1.54771$ | $\nu_{11} = 62.8$ | |
| $r_{21} = \infty$ | | | |
| $d_{21} = 1.0$ | | | |
| $r_{22} = \infty$ | | | |
| $d_{22} = 0.7$ | $n_{12} = 1.51633$ | $\nu_{12} = 64.2$ | |
| $r_{23} = \infty$ | | | |
| $d_{23} = 0.3$ | | | |
| $r_{24} = \infty$ | | | |
| $d_{24} = 0.6$ | $n_{13} = 1.48749$ | $\nu_{13} = 70.2$ | |
| $r_{25} = \infty$ | | | |

| | | | |
|---|---|---|---|
| f | 10.3 | 16.4 | 26.2 |
| $D_1$ | 1.00 | 7.46 | 12.74 |
| $D_2$ | 0.85 | 1.78 | 0.81 |
| $D_3$ | 12.70 | 5.31 | 1.00 |
| fB | 16.32 | 16.32 | 16.32 |
| total length | 57.19 | 57.19 | 57.19 | radial GRIN lens 1

| | $n_0$ | g | $h_4$ |
|---|---|---|---|
| d line | 1.59468 | $0.41643 \times 10^{-1}$ | $-0.98948 \times 10$ |
| C line | 1.59055 | $0.41445 \times 10^{-1}$ | $-0.99920 \times 10$ |
| F line | 1.60409 | $0.41805 \times 10^{-1}$ | $-0.98164 \times 10$ |

| | $h_6$ | $h_8$ |
|---|---|---|
| d line | $0.84248 \times 10^3$ | $-0.44331 \times 10^5$ |
| C line | $0.85865 \times 10^3$ | $-0.43100 \times 10^5$ |
| F line | $0.82955 \times 10^3$ | $-0.45360 \times 10^5$ | radial GRIN lens 2

| | $n_0$ | g | $h_4$ |
|---|---|---|---|
| d line | 1.59468 | $0.25127 \times 10^{-1}$ | $-0.98948 \times 10$ |
| C line | 1.59055 | $0.25008 \times 10^{-1}$ | $-0.99920 \times 10$ |
| F line | 1.60409 | $0.25225 \times 10^{-1}$ | $-0.98164 \times 10$ |

| | $h_6$ | $h_8$ |
|---|---|---|
| d line | $0.84248 \times 10^3$ | $-0.44331 \times 10^5$ |
| C line | $0.85865 \times 10^3$ | $-0.43100 \times 10^5$ |
| F line | $0.82955 \times 10^3$ | $-0.45360 \times 10^5$ |

$h_6/h_4 = -85.14$, $h_8/h_4 = 4480.23$,
$\Delta n = -0.014166$ (effective diameter 10 mm)
$(b/n_b)/\{a + (b/n_b)\} = 0.193$ Embodiment 3

$f = 10.3 \sim 26.2$, F/2.7, $2\omega = 44.3° \sim 18.2°$

| | | | |
|---|---|---|---|
| $r_1 = 22.98$ | | | |
| $d_1 = 1.5$ | $n_1 = 1.84666$ | $\nu_1 = 23.8$ | |
| $r_2 = 16.51$ | | | |
| $d_2 = 0.3$ | | | |
| $r_3 = 17.82$ | | | |
| $d_3 = 4.7$ | $n_2 = 1.72916$ | $\nu_2 = 54.7$ | |
| $r_4 = \infty$ | | | |
| $d_4 = D_1$ (variable) | | | |
| $r_5 = 37.70$ | | | |
| $d_5 = 0.9$ | $n_3 = 1.6968$ | $\nu_3 = 56.5$ | |
| $r_6 = 8.99$ | | | |
| $d_6 = 2.6$ | | | |
| $r_7 = -13.89$ | | | |
| $d_7 = 0.8$ | $n_4 = 1.617$ | $\nu_4 = 62.8$ | |

-continued

| | | | |
|---|---|---|---|
| $r_8 = 52.30$ | | | |
| $d_8 = D_2$ (variable) | | | |
| $r_9 = 26.90$ | | | |
| $d_9 = 1.7$ | $n_5 = 1.84666$ | $\nu_5 = 23.8$ | |
| $r_{10} = \infty$ | | | |
| $d_{10} = D_3$ (variable) | | | |
| $r_{11} =$ stop | | | |
| $d_{11} = 1.8$ | | | |
| $r_{12} = 14.92$ | | | |
| $d_{12} = 2.3$ | $n_6 = 1.88300$ | $\nu_6 = 40.8$ | |
| $r_{13} = -145.97$ | | | |
| $d_{13} = 1.4$ | | | |
| $r_{14} = -13.55$ | | | |
| $d_{14} = 4.0$ | $n_7 = 1.80518$ | $\nu_7 = 25.4$ | |
| $r_{15} = 10.01$ | | | |
| $d_{15} = 4.4$ | $n_8 = 1.60562$ | $\nu_8 = 43.7$ | |
| $r_{16} = -13.46$ | | | |
| $d_{16} = 0.2$ | | | |
| $r_{17} = 27.22$ | | | |
| $d_{17} = 2.5$ | $n_9 =$ radial GRIN lens | | |
| $r_{18} = -28.09$ | | | |
| $d_{18} = 10.6$ | | | |
| $r_{19} = \infty$ | | | |
| $d_{19} = 1.0$ | $n_{10} = 1.51633$ | $\nu_{10} = 64.2$ | |
| $r_{20} = \infty$ | | | |
| $d_{20} = 4.8$ | $n_{11} = 1.54771$ | $\nu_{11} = 62.8$ | |
| $r_{21} = \infty$ | | | |
| $d_{21} = 1.0$ | | | |
| $r_{22} = \infty$ | | | |
| $d_{22} = 0.7$ | $n_{12} = 1.51633$ | $\nu_{12} = 64.2$ | |
| $r_{23} = \infty$ | | | |
| $d_{23} = 0.3$ | | | |
| $r_{24} = \infty$ | | | |
| $d_{24} = 0.6$ | $n_{13} = 1.48749$ | $\nu_{13} = 70.2$ | |
| $r_{25} = \infty$ | | | |

| | | | |
|---|---|---|---|
| f | 10.3 | 16.4 | 26.2 |
| $D_1$ | 1.00 | 7.46 | 12.74 |
| $D_2$ | 0.85 | 1.78 | 0.81 |
| $D_3$ | 12.70 | 5.31 | 1.00 |
| fB | 16.55 | 16.55 | 16.55 |
| total length | 60.22 | 60.22 | 60.22 | radial GRIN lens

| | $n_0$ | g | $h_4$ |
|---|---|---|---|
| d line | 1.59468 | $0.24828 \times 10^{-1}$ | $-0.10766 \times 10^2$ |
| C line | 1.59055 | $0.24710 \times 10^{-1}$ | $-0.10871 \times 10^2$ |
| F line | 1.60409 | $0.24924 \times 10^{-1}$ | $-0.10681 \times 10^2$ |

| | $h_6$ | $h_8$ |
|---|---|---|
| d line | $0.56821 \times 10^3$ | $-0.37814 \times 10^5$ |
| C line | $0.57909 \times 10^3$ | $-0.38098 \times 10^5$ |
| F line | $0.55950 \times 10^3$ | $-0.36946 \times 10^5$ |

$h_6/h_4 = -52.78$, $h_8/h_4 = 3512.35$,
$\Delta n = -0.014434$ (effective diameter 10 mm)
$(b/n_b)/\{a + (b/n_b)\} = 0.608$ Embodiment 4

$f = 10.3 \sim 26.2$, F/2.7, $2\omega = 44.3° \sim 18.2°$

| | | | |
|---|---|---|---|
| $r_1 = 22.98$ | | | |
| $d_1 = 1.5$ | $n_1 = 1.84666$ | $\nu_1 = 23.8$ | |
| $r_2 = 16.51$ | | | |
| $d_2 = 0.3$ | | | |
| $r_3 = 17.82$ | | | |
| $d_3 = 4.7$ | $n_2 = 1.72916$ | $\nu_2 = 54.7$ | |
| $r_4 = \infty$ | | | |
| $d_4 = D_1$ (variable) | | | |
| $r_5 = 37.70$ | | | |
| $d_5 = 0.9$ | $n_3 = 1.6968$ | $\nu_3 = 56.5$ | |
| $r_6 = 8.99$ | | | |
| $d_6 = 2.6$ | | | |
| $r_7 = -13.89$ | | | |
| $d_7 = 0.8$ | $n_4 = 1.617$ | $\nu_4 = 62.8$ | |
| $r_8 = 52.30$ | | | |
| $d_8 = 0.9$ | | | |
| $r_9 = 26.90$ | | | |
| $d_9 = 1.7$ | $n_5 = 1.84666$ | $\nu_5 = 23.8$ | |
| $r_{10} = \infty$ | | | |
| $d_{10} = D_2$ (variable) | | | |
| $r_{11} =$ stop | | | |
| $d_{11} = 1.8$ | | | |
| $r_{12} = 15.03$ | | | |
| $d_{12} = 2.0$ | $n_6 = 1.883$ | $\nu_6 = 40.8$ | |
| $r_{13} = \infty$ | | | |

-continued

| | | | |
|---|---|---|---|
| | $d_{13} = 3.3$ | | |
| $r_{14} = -9.85$ | | | |
| | $d_{14} = 1.3$ | $n_7 = 1.80518$ | $\nu_7 = 25.4$ |
| $r_{15} = 11.12$ | | | |
| | $d_{15} = 4.3$ | $n_8 = 1.60562$ | $\nu_8 = 43.7$ |
| $r_{16} = -10.17$ | | | |
| | $d_{16} = 0.2$ | | |
| $r_{17} = 25.69$ | | | |
| | $d_{17} = 2.5$ | $n_9$ = radial GRIN lens | |
| $r_{18} = -24.42$ | | | |
| | $d_{18} = 10.6$ | | |
| $r_{19} = \infty$ | | | |
| | $d_{19} = 1.0$ | $n_{10} = 1.51633$ | $\nu_{10} = 64.2$ |
| $r_{20} = \infty$ | | | |
| | $d_{20} = 4.8$ | $n_{11} = 1.54771$ | $\nu_{11} = 62.8$ |
| $r_{21} = \infty$ | | | |
| | $d_{21} = 1.0$ | | |
| $r_{22} = \infty$ | | | |
| | $d_{22} = 0.7$ | $n_{12} = 1.51633$ | $\nu_{12} = 64.2$ |
| $r_{23} = \infty$ | | | |
| | $d_{23} = 0.3$ | | |
| $r_{24} = \infty$ | | | |
| | $d_{24} = 0.6$ | $n_{13} = 1.48749$ | $\nu_{13} = 70.2$ |
| $r_{25} = \infty$ | | | |

| | | | |
|---|---|---|---|
| f | 10.3 | 16.4 | 26.2 |
| $D_1$ | 0.99 | 6.89 | 12.77 |
| $D_2$ | 12.69 | 6.11 | 0.97 |
| fB | 16.67 | 17.37 | 16.64 |
| total length | 59.03 | 59.03 | 59.03 | radial GRIN lens

| | $n_0$ | g | $h_4$ |
|---|---|---|---|
| d line | 1.5983 | $0.2488 \times 10^{-1}$ | $-0.1138 \times 10^2$ |
| C line | 1.5942 | $0.2476 \times 10^{-1}$ | $-0.1149 \times 10^2$ |
| F line | 1.6078 | $0.2498 \times 10^{-1}$ | $-0.1129 \times 10^2$ |
| | | $h_6$ | $h_8$ |
| d line | | $0.6517 \times 10^3$ | $-0.4203 \times 10^5$ |
| C line | | $0.6642 \times 10^3$ | $-0.4324 \times 10^5$ |
| F line | | $0.6417 \times 10^3$ | $-0.4106 \times 10^5$ |

$h_6/h_4 = -57.28$, $h_8/h_4 = 3693.62$,
$\Delta n = -0.014611$ (effective diameter 10 mm)
$(b/n_b)/\{a + (b/n_b)\} = 0.180$ Embodiment 5

$f = 10.3 \sim 26.2$, F/2.7, $2\omega = 44.3° \sim 18.2°$

| | | | |
|---|---|---|---|
| $r_1 = 22.98$ | | | |
| | $d_1 = 1.5$ | $n_1 = 1.84666$ | $\nu_1 = 23.8$ |
| $r_2 = 16.51$ | | | |
| | $d_2 = 0.3$ | | |
| $r_3 = 17.82$ | | | |
| | $d_3 = 4.7$ | $n_2 = 1.72916$ | $\nu_2 = 54.7$ |
| $r_4 = \infty$ | | | |
| | $d_4 = D_1$ (variable) | | |
| $r_5 = 37.70$ | | | |
| | $d_5 = 0.9$ | $n_3 = 1.6968$ | $\nu_3 = 56.5$ |
| $r_6 = 8.99$ | | | |
| | $d_6 = 2.6$ | | |
| $r_7 = -13.89$ | | | |
| | $d_7 = 0.8$ | $n_4 = 1.617$ | $\nu_4 = 62.8$ |
| $r_8 = 52.30$ | | | |
| | $d_8 = 0.9$ | | |
| $r_9 = 26.90$ | | | |
| | $d_9 = 1.7$ | $n_5 = 1.84666$ | $\nu_5 = 23.8$ |
| $r_{10} = \infty$ | | | |
| | $d_{10} = D_2$ (variable) | | |
| $r_{11}$ = stop | | | |
| | $d_{11} = 1.8$ | | |
| $r_{12} = 15.00$ | | | |
| | $d_{12} = 2.0$ | $n_6 = 1.883$ | $\nu_6 = 40.8$ |
| $r_{13} = \infty$ | | | |
| | $d_{13} = 3.3$ | | |
| $r_{14} = -9.87$ | | | |
| | $d_{14} = 1.3$ | $n_7 = 1.80518$ | $\nu_7 = 25.4$ |
| $r_{15} = 11.16$ | | | |
| | $d_{15} = 4.3$ | $n_8 = 1.60562$ | $\nu_8 = 43.7$ |
| $r_{16} = -10.17$ | | | |
| | $d_{16} = 0.2$ | | |
| $r_{17} = 26.02$ | | | |
| | $d_{17} = 2.5$ | $n_9$ = radial GRIN lens | |
| $r_{18} = -24.64$ | | | |
| | $d_{18} = 10.6$ | | |
| $r_{19} = \infty$ | | | |
| | $d_{19} = 1.0$ | $n_{10} = 1.51633$ | $\nu_{10} = 64.2$ |
| $r_{20} = \infty$ | | | |
| | $d_{20} = 4.8$ | $n_{11} = 1.54771$ | $\nu_{11} = 62.8$ |
| $r_{21} = \infty$ | | | |
| | $d_{21} = 1.0$ | | |
| $r_{22} = \infty$ | | | |
| | $d_{22} = 0.7$ | $n_{12} = 1.51633$ | $\nu_{12} = 64.2$ |
| $r_{23} = \infty$ | | | |
| | $d_{23} = 0.3$ | | |
| $r_{24} = \infty$ | | | |
| | $d_{24} = 0.6$ | $n_{13} = 1.48749$ | $\nu_{13} = 70.2$ |
| $r_{25} = \infty$ | | | |

| | | | |
|---|---|---|---|
| f | 10.3 | 16.4 | 26.2 |
| $D_1$ | 0.93 | 8.17 | 12.71 |
| $D_2$ | 12.69 | 8.15 | 0.93 |
| fB | 16.63 | 16.63 | 16.63 |
| total length | 58.91 | 61.60 | 58.91 | radial GRIN lens

| | $n_0$ | g | $h_4$ |
|---|---|---|---|
| d line | 1.5982 | $0.2456 \times 10^{-1}$ | $-0.9202 \times 10$ |
| C line | 1.5941 | $0.2445 \times 10^{-1}$ | $-0.9292 \times 10$ |
| F line | 1.6077 | $0.2466 \times 10^{-1}$ | $-0.9129 \times 10$ |
| | | $h_6$ | $h_8$ |
| d line | | $0.4871 \times 10^3$ | $-0.3659 \times 10^5$ |
| C line | | $0.4964 \times 10^3$ | $-0.3765 \times 10^5$ |
| F line | | $0.4797 \times 10^3$ | $-0.3576 \times 10^5$ |

$h_6/h_4 = -52.94$, $h_8/h_4 = 3976.98$,
$\Delta n = -0.013965$ (effective diameter 10 mm)
$(b/n_b)/\{a + (b/n_b)\} = 0.180$ wherein the reference symbols $r_1, r_2, \ldots$ represent the radii of curvature on the surfaces of the respective lens elements, the reference symbols $d_1, d_2, \ldots$ designate the thicknesses of the respective lens elements and the airspaces reserved therebetween, the reference symbols $n_1, n_2, \ldots$ denote the refractive indices of the respective lens elements, the reference symbols $\nu_1, \nu_2, \ldots$ represent the Abbe's numbers of the respective lens elements, the reference symbol $f_B$ designates the back focal length of the zoom lens system expressed in terms of optical path length and the reference symbol f denotes the focal length of the zoom lens system as a whole.

Figure 2:
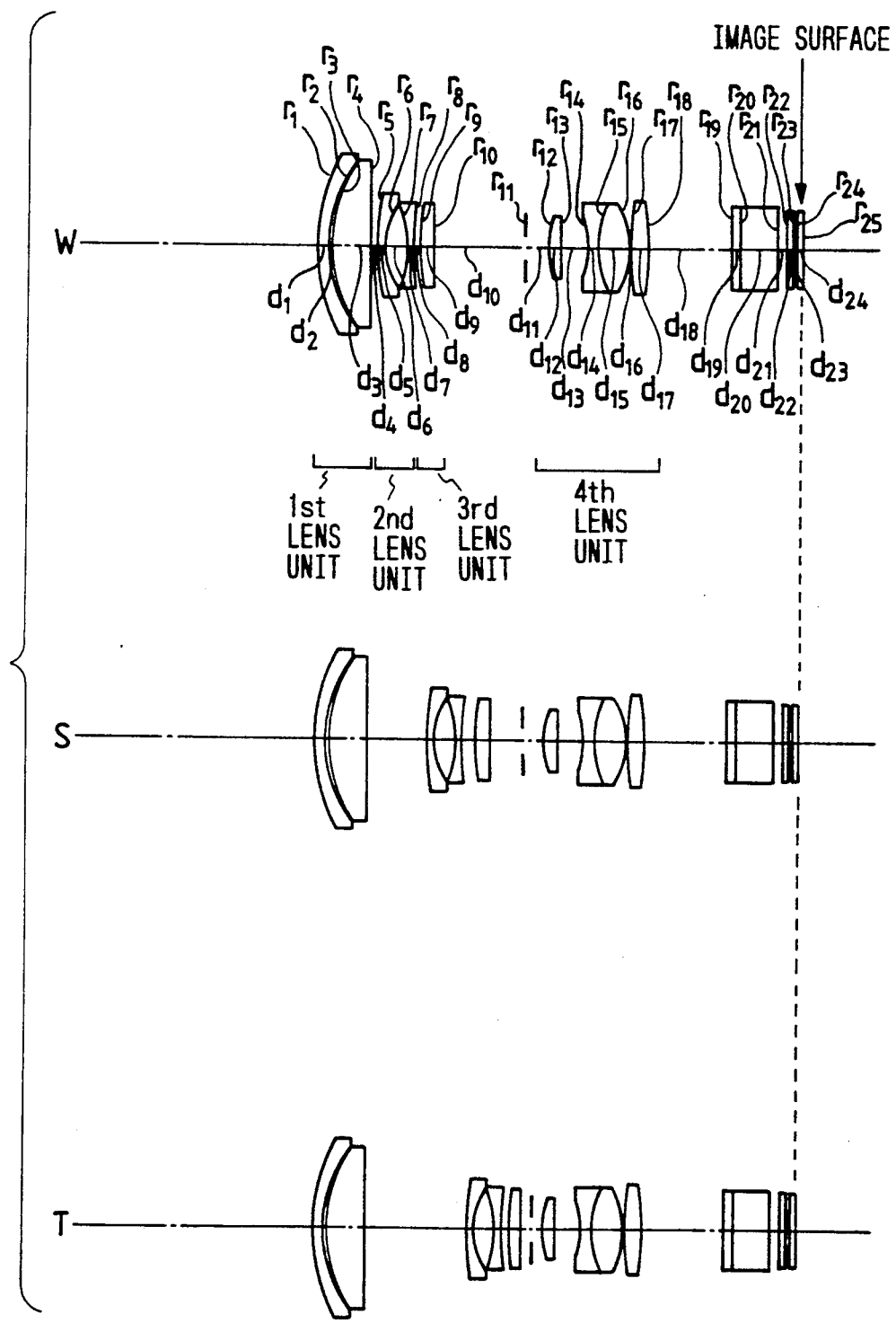
Figure 3:
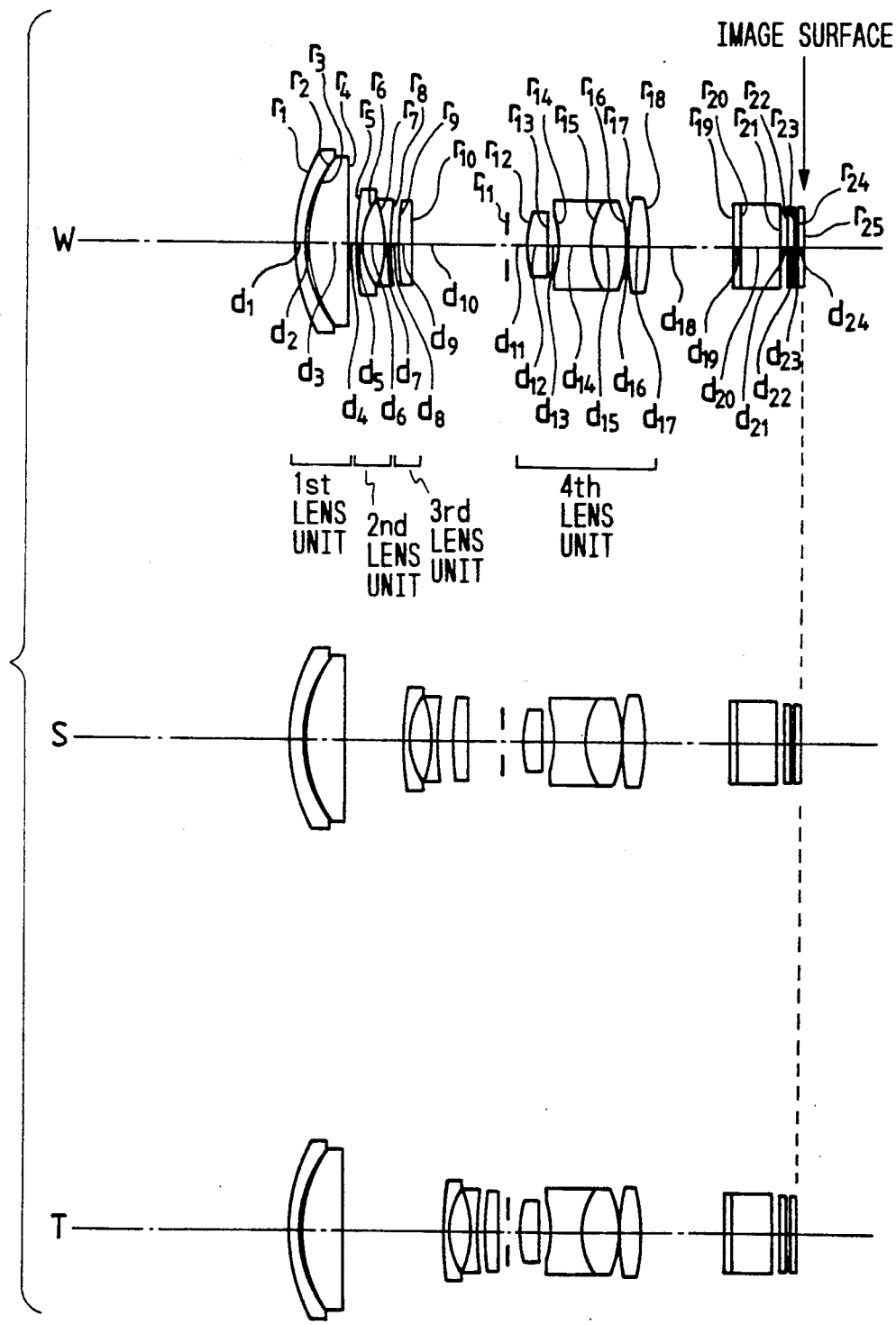

The Embodiments 1 through 3 have the compositions illustrated in FIG. 1 through FIG. 3 respectively, in each of which the first lens unit and the final lens unit are kept fixed, whereas the second lens unit and the third lens unit are moved along the optical axis for varying focal length of the zoom lens system. That is to say, the second lens unit and the third lens unit function as the variator and the compensator respectively.

In the Embodiment 1, only the lens component arranged on the image side is designed as a radial GRIN lens component.

As compared with the conventional example of zoom lens system, the Embodiment 1 is approximately 3.5 mm shorter in the back focal length $f_B$ and approximately 10 mm shorter in the distance as measured from the first surface of the zoom lens system to the image surface thereof.

In the Embodiment 2, both the lens components which are arranged on the image side and at the location immediately after the aperture stop are designed as radial GRIN lens components. In the conventional example, the lens component arranged at the location immediately after the aperture stop is made of a glass material having a high refractive index mainly for suppressing production of spherical aberration. In the Embodiment 2 of the present invention, in contrast, the lens component arranged at the location immediately after the aperture stop is made of a glass material having a low refractive index which is so distributed as to be lowered as the portions of said lens component are farther from the optical axis mainly for suppressing production of spherical aberration.

As to the back focal length $f_B$ and total length, the Embodiment 2 is substantially the same as the Embodiment 1.

The Embodiment 3 is similar in composition to the Embodiment 1 and uses a radial GRIN lens component as the lens component arranged on the image side. The Embodiment 3 is similar in the other features to the Embodiment 1.

Figure 4:
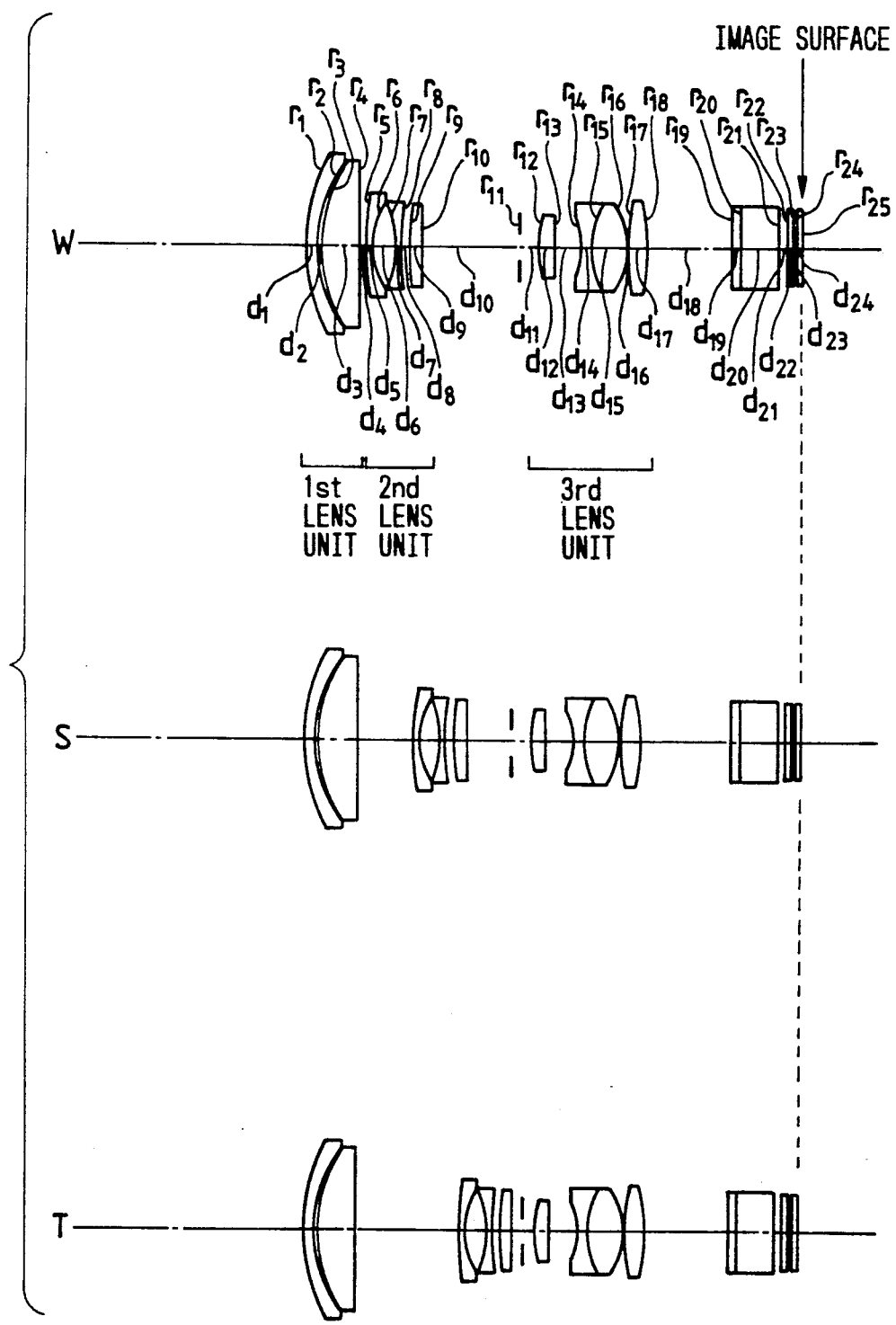

The Embodiment 4 has the composition illustrated in FIG. 4, wherein the zoom lens system consists of three lens units. The second lens unit and the final lens unit are movable along the optical axis, and function as the variator and compensator respectively. That is to say, the Embodiment 4 is equivalent to each of the Embodiments 1 through 3 when the second lens unit and the third lens unit are moved integrally in the latter, or the second lens unit used in the Embodiment 4 corresponds to the second lens unit and the third lens unit which are integrated with each other in each of the Embodiments 1 through 3.

Figure 5:
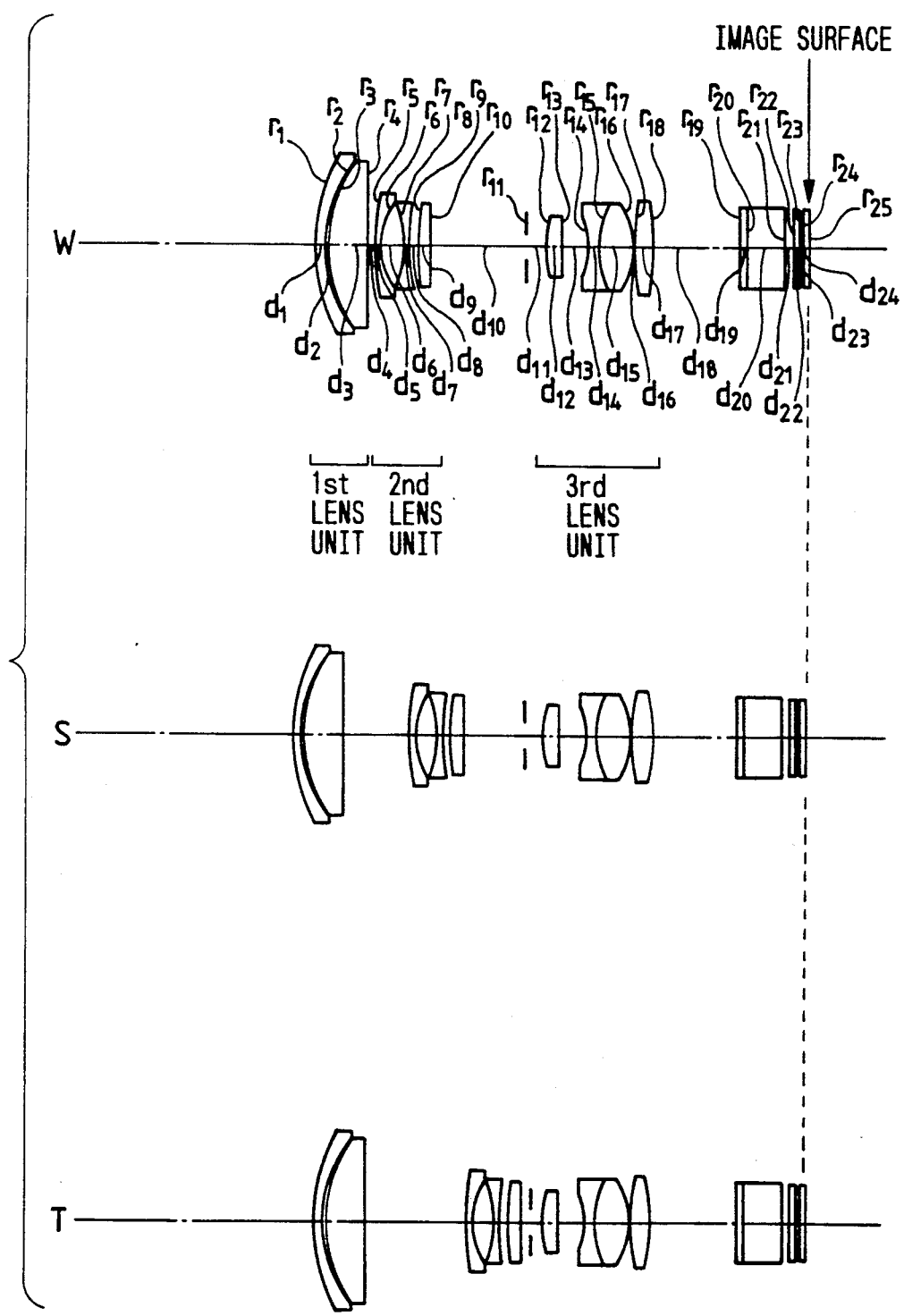

The Embodiment 5 has the composition illustrated in FIG. 5, wherein the zoom lens system consists of three lens units, out of which the final lens unit is kept fixed, whereas the first lens unit and the second lens unit are moved along the optical axis for varying focal length of the zoom lens system. Accordingly, the first lens unit and the second lens unit function as the variator and the compensator respectively. The Embodiment 5 is equivalent to each of the Embodiments 1 through 3 when the second lens unit and the third lens unit are moved integrally along the optical axis, and the first lens unit is moved separately along the optical axis in the latter.

In addition, the reference symbols $r_{19}$ through $r_{25}$ used in the numerical data represent an infrared cut filter, a low pass filter, a cover glass plate and so on which are provided for a solid-state image pickup device.

The GRIN lens used in the lens system of the present invention satisfies the following condition (6).

$$1.55 < n_0 < 1.65 \tag{6}$$

wherein reference symbol $n_0$ represents the refractive index of said GRIN lens as measured on the optical axis.

As is understood from the foregoing description, the zoom lens system according to the present invention comprises at least three lens units, uses a radial GRIN lens component at the image side location for shortening the back focal length and total length thereof, and has favorably corrected aberrations.

Figure 6:
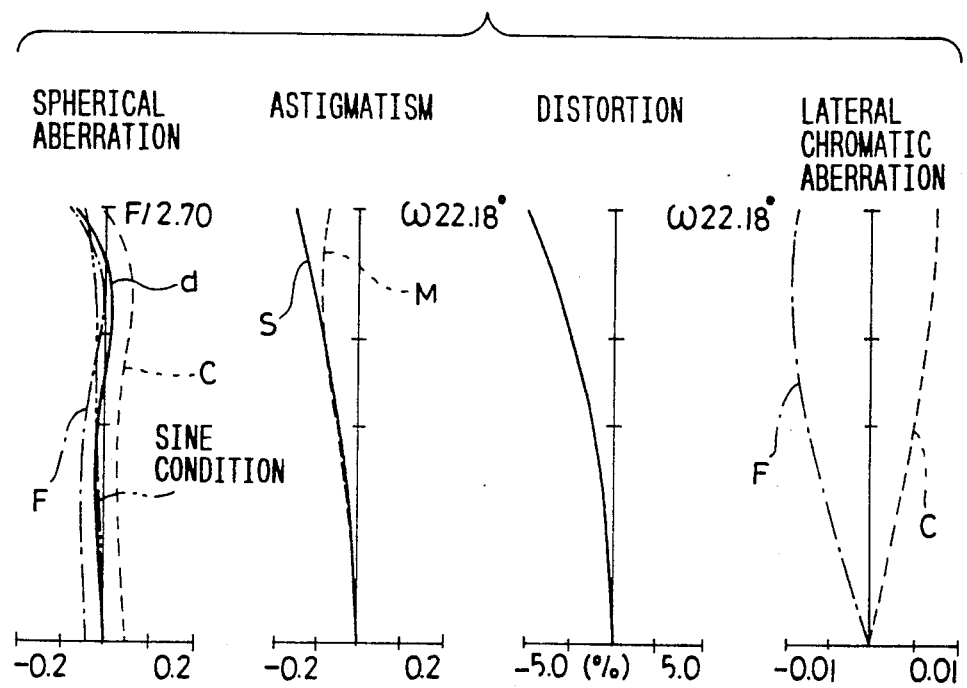
FIG. 6 shows graphs illustrating aberration characteristics at the wide position of the Embodiment 1.

FIG. 6 shows graphs illustrating aberration characteristics at the wide position of the Embodiment 1.

Figure 7:
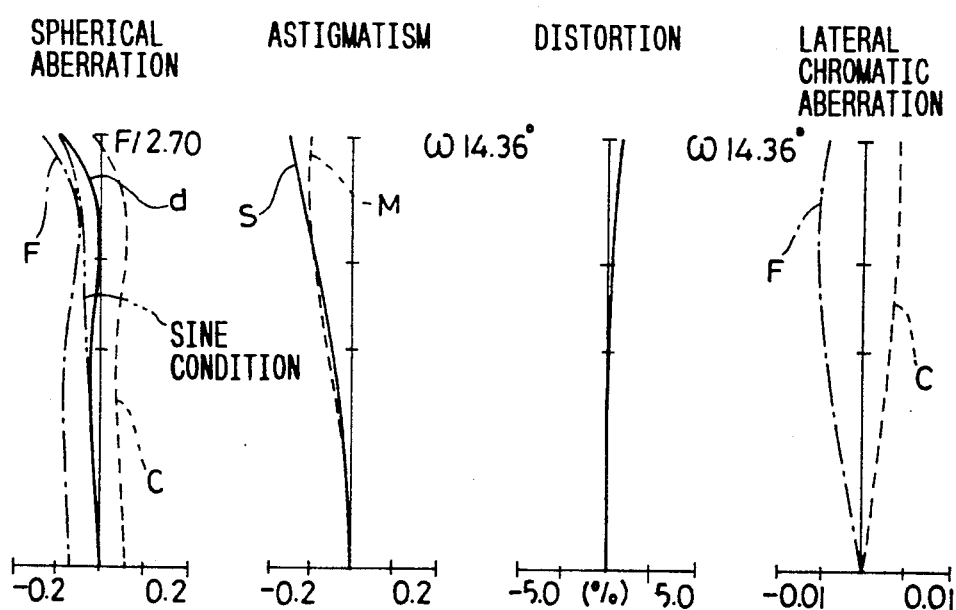
FIG. 7 shows graphs illustrating aberration characteristics at the intermediate focal length of the Embodiment 1.

FIG. 7 shows graphs illustrating aberration characteristics at the intermediate focal length of the Embodiment 1.

Figure 8:
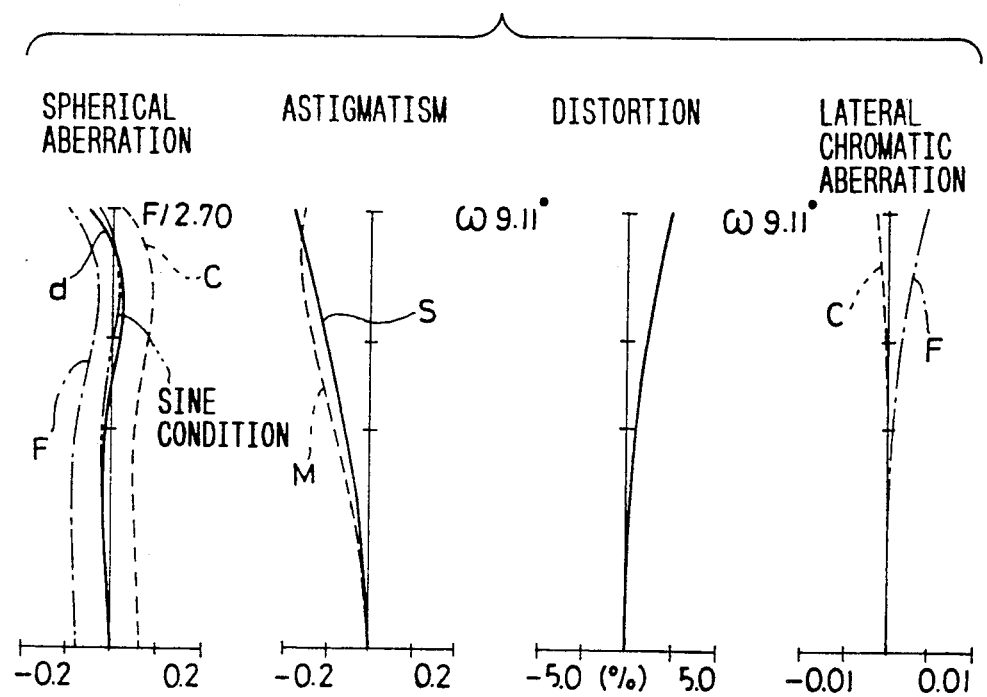
FIG. 8 shows graphs illustrating aberration characteristics at the tele position of the Embodiment 1.

FIG. 8 shows graphs illustrating aberration characteristics at the tele position of the Embodiment 1.

Figure 9:
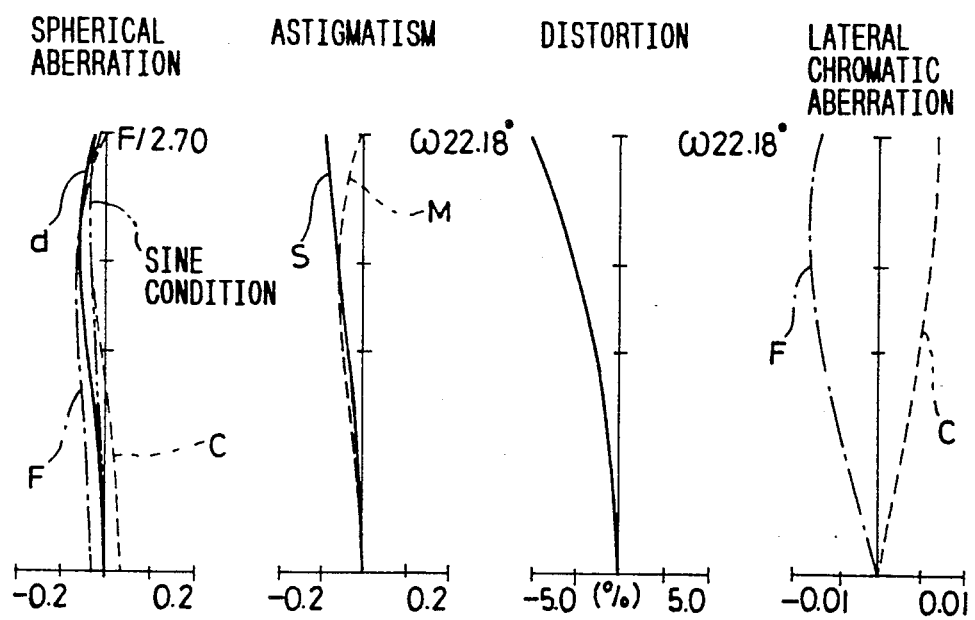
FIG. 9 shows curves illustrating aberration characteristics at the wide position of the Embodiment 2.

FIG. 9 shows curves illustrating aberration characteristics at the wide position of the Embodiment 2.

Figure 10:
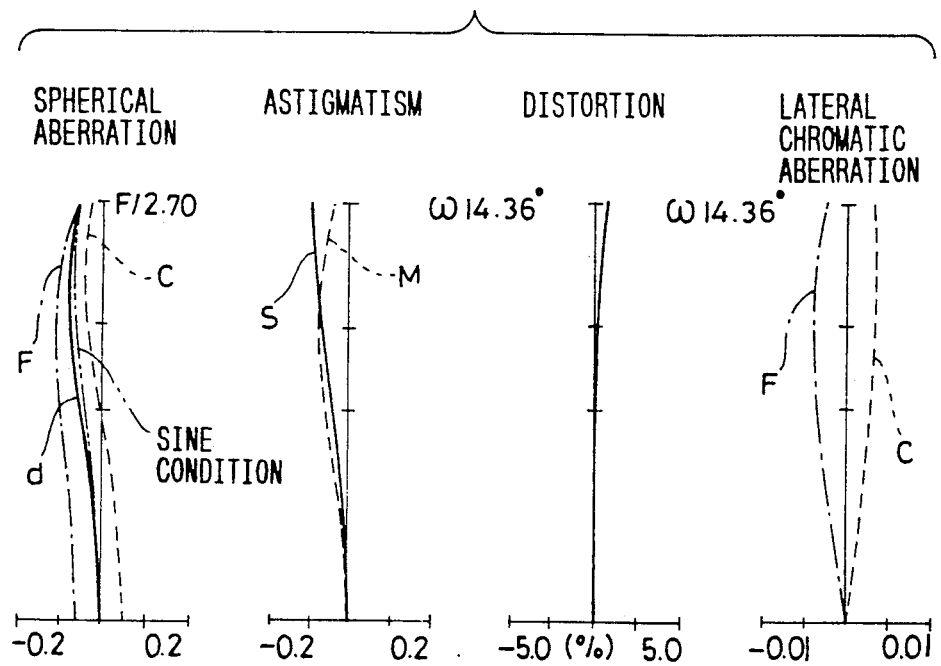
FIG. 10 shows curves illustrating aberration characteristics at the intermediate focal length of the Embodiment 2.

FIG. 10 shows curves illustrating aberration characteristics at the intermediate focal length of the Embodiment 2.

Figure 11:
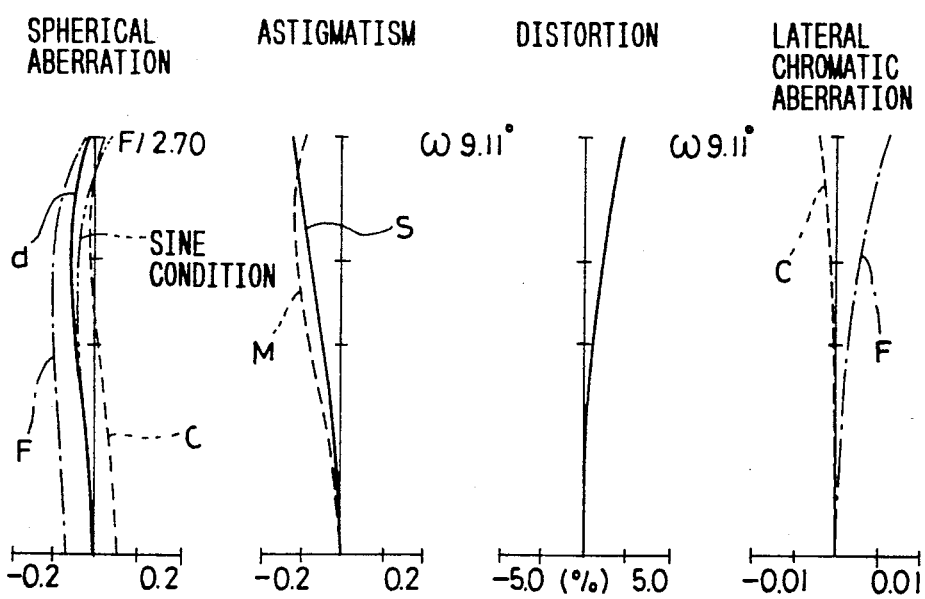
FIG. 11 shows curves illustrating aberration characteristics at the tele position of the Embodiment 2.

FIG. 11 shows curves illustrating aberration characteristics at the tele position of the Embodiment 2.

Figure 12:
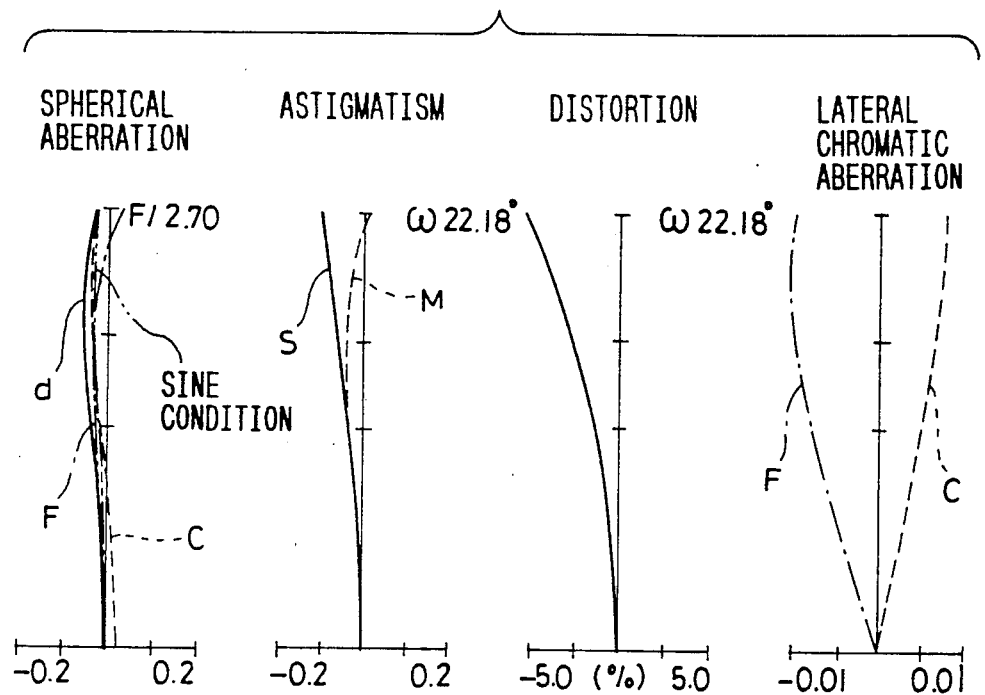
FIG. 12 shows graphs visualizing aberration characteristics at the wide position of the Embodiment 3.

FIG. 12 shows graphs visualizing aberration characteristics at the wide position of the Embodiment 3.

Figure 13:
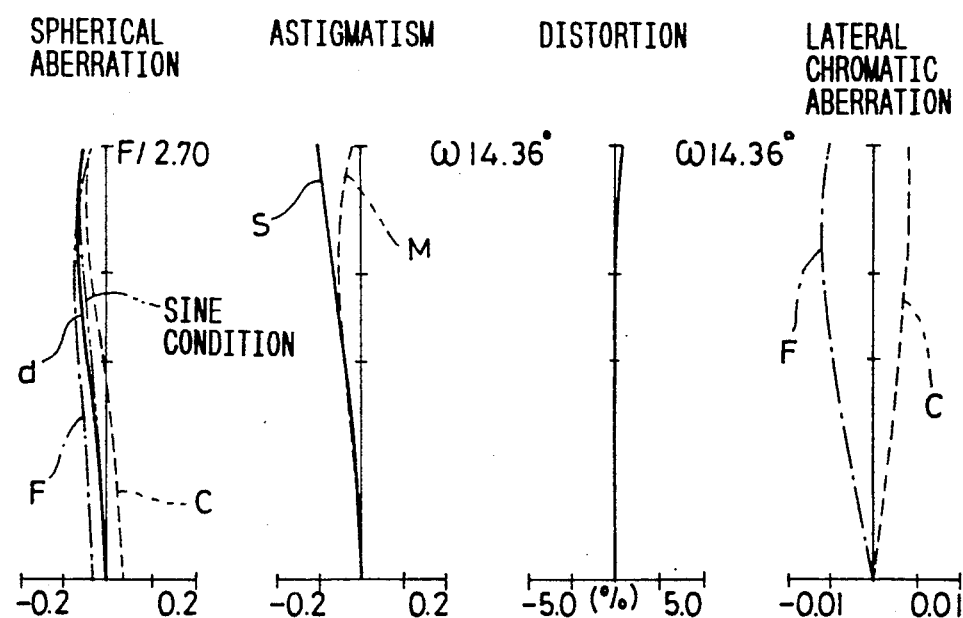
FIG. 13 shows graphs illustrating aberration characteristics at the intermediate focal length of the Embodiment 3.

FIG. 13 shows graphs illustrating aberration characteristics at the intermediate focal length of the Embodiment 3.

Figure 14:
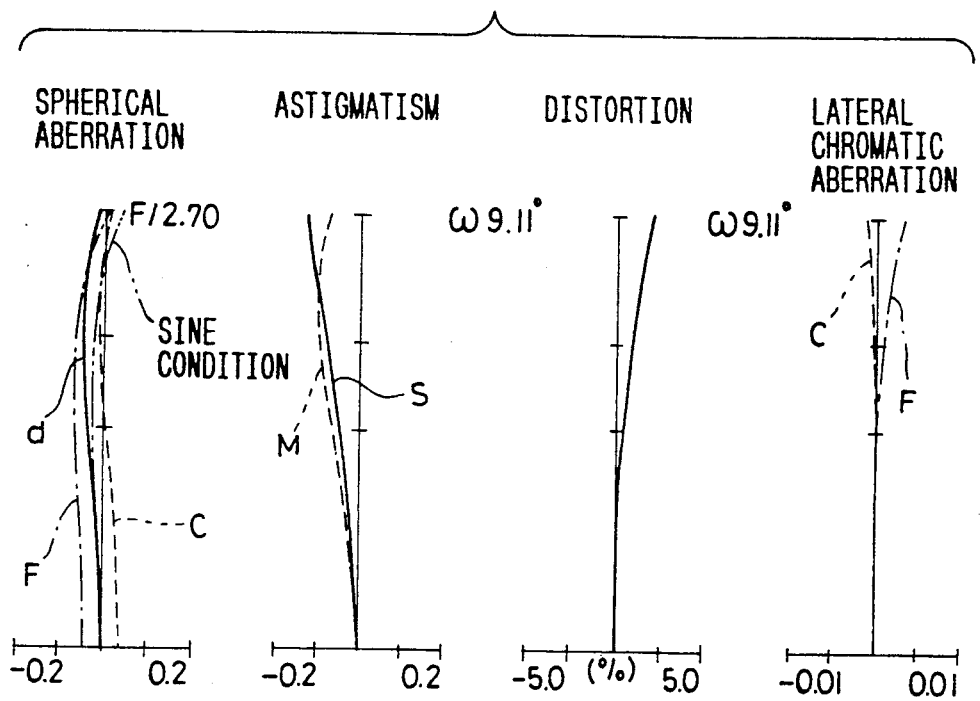
FIG. 14 shows graphs visualizing aberration characteristics at the tele position of the Embodiment 3.

FIG. 14 shows graphs visualizing aberration characteristics at the tele position of the Embodiment 3.

Figure 15:
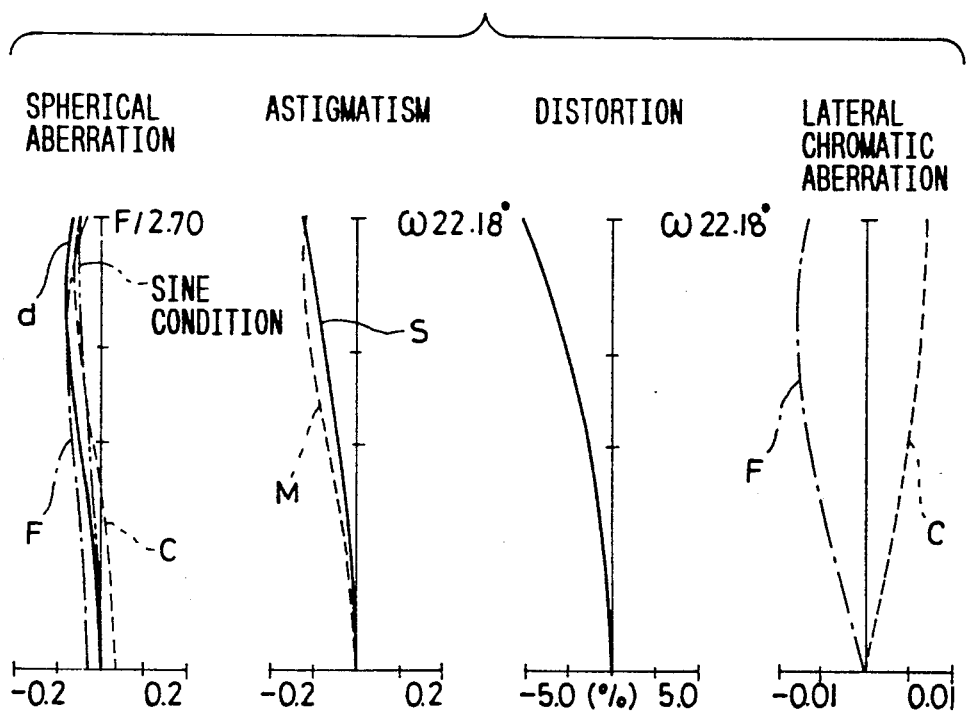
FIG. 15 shows curves visualizing aberration characteristics at the wide position of the Embodiment 4.

FIG. 15 shows curves visualizing aberration characteristics at the wide position of the Embodiment 4.

Figure 16:
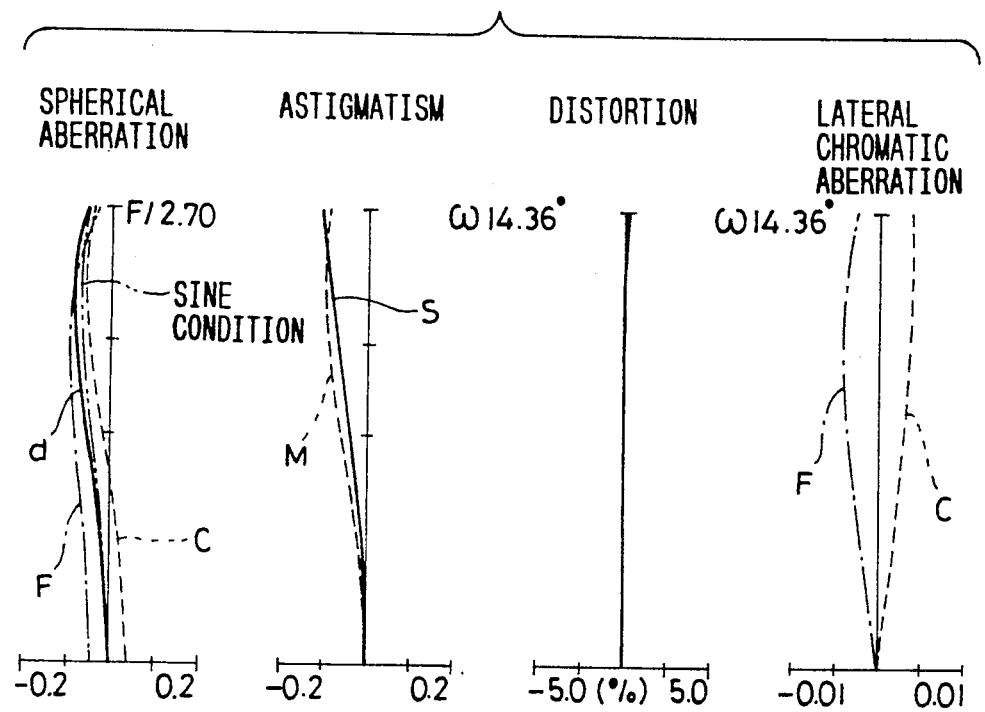
FIG. 16 shows curves visualizing aberration characteristics at the intermediate focal length of the Embodiment 4.

FIG. 16 shows curves visualizing aberration characteristics at the intermediate focal length of the Embodiment 4.

Figure 17:
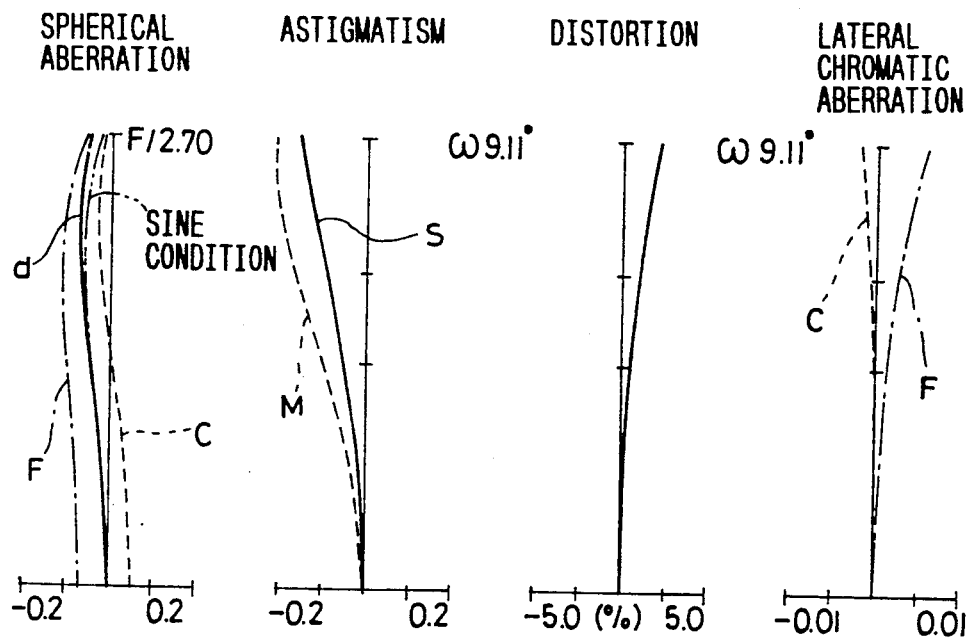
FIG. 17 shows curves visualizing aberration characteristics at the tele position of the Embodiment 4.

FIG. 17 shows curves visualizing aberration characteristics at the tele position of the Embodiment 4.

Figure 18:
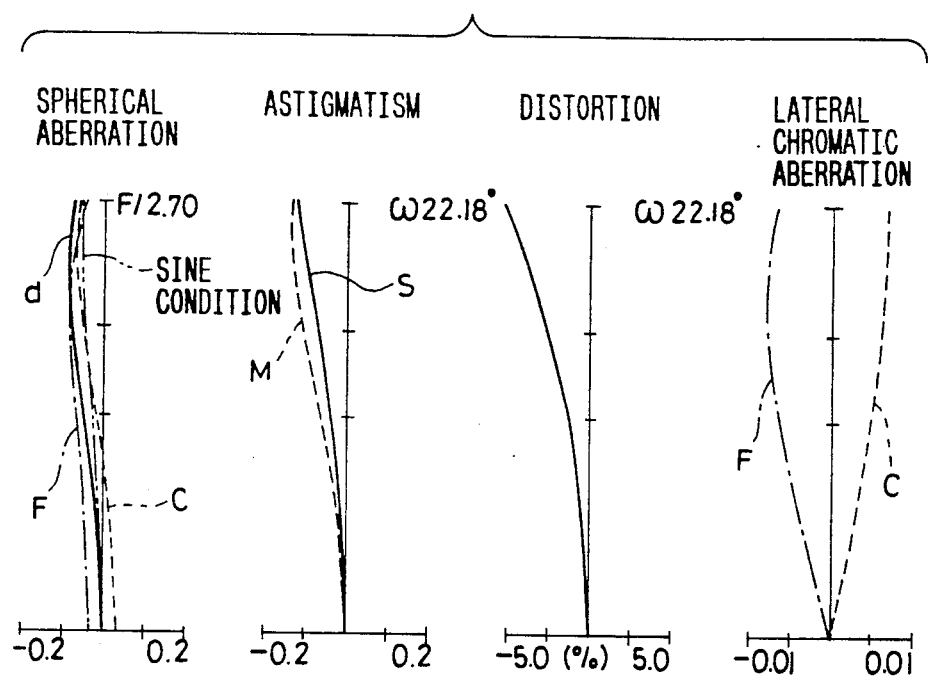
FIG. 18 shows graphs illustrating aberration characteristics at the wide position of the Embodiment 5.

FIG. 18 shows graphs illustrating aberration characteristics at the wide position of the Embodiment 5.

Figure 19:
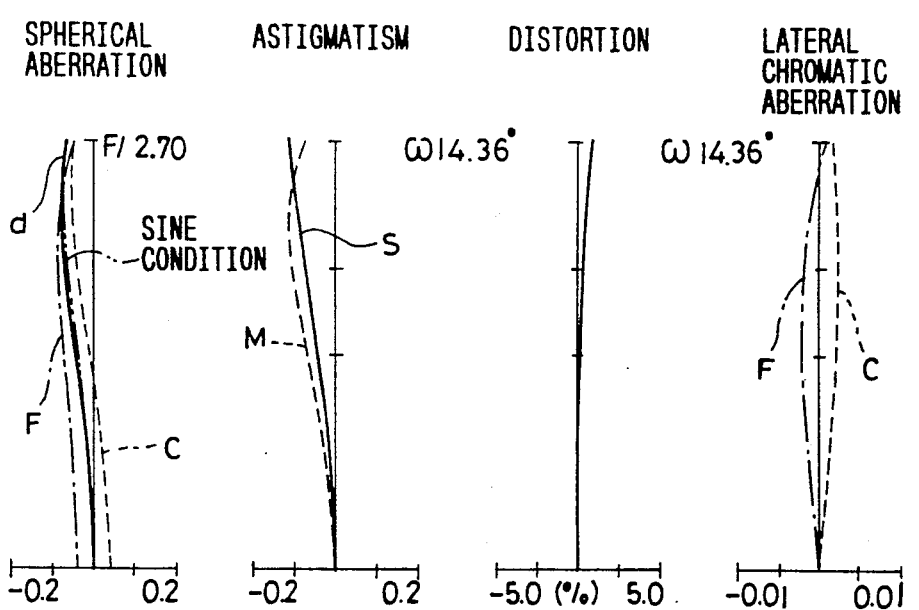
FIG. 19 shows graphs visualizing aberration characteristics at the intermediate focal length of the Embodiment 5.

FIG. 19 shows graphs visualizing aberration characteristics at the intermediate focal length of the Embodiment 5.

Figure 20:
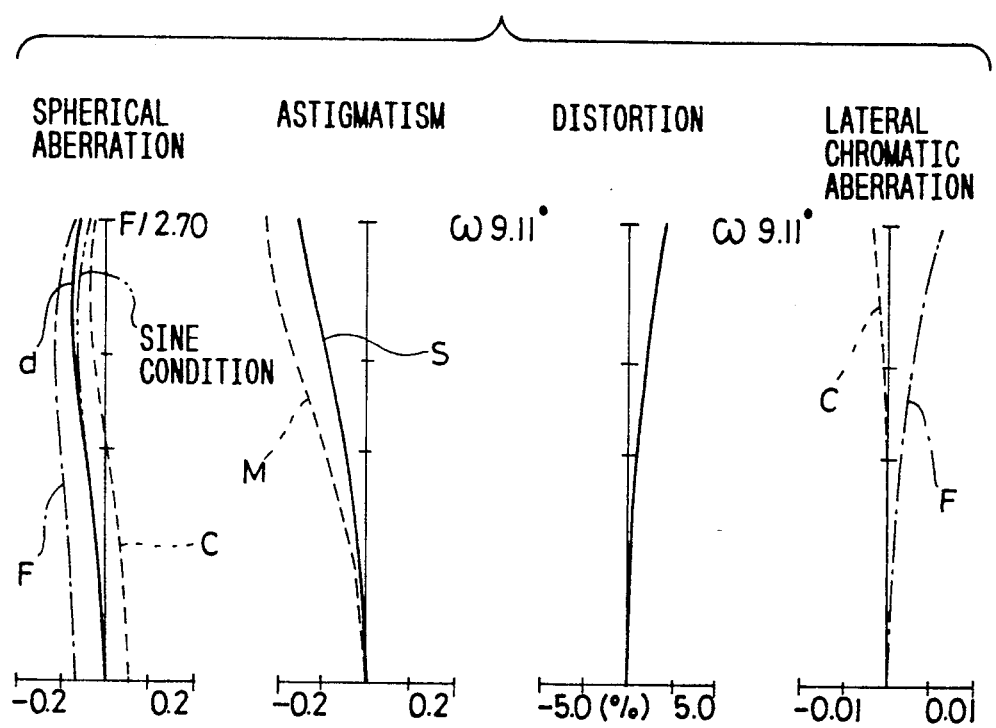
FIG. 20 shows graphs illustrating aberration characteristics at the tele position of the Embodiment 5.

FIG. 20 shows graphs illustrating aberration characteristics at the tele position of the Embodiment 5.

I claim:

1. A zoom lens system having a plurality of lens units including at least a first lens unit having a positive refractive power as a whole, a second lens unit having a negative refractive power as a whole, and a final lens unit having a positive refractive power as a whole, said final lens unit comprising:

a positive lens component arranged facing in the direction of an object side;

a lens component having a concave diverging surface facing in the direction of the object side; and a positive lens component arranged facing in the direction of an image side, said zoom lens system being adaptable for modifying a focal length by varying at lest two airspaces reserved between the plurality of lens units, whereby the lens component arranged facing in the direction of the image side is designed as a graded refractive index lens component having its refractive index lowered at portions of said graded refractive lens component extending away from its optical axis, said graded refractive index lens component satisfying the following conditions (1) and (2), and having a refractive index distribution expressed by a formula shown below:

$$h_6/h_4 < -10 \tag{1}$$

$$h_8/h_4 > 10^3 \tag{2}$$

$$n^2(s) = n_0^2 \{1 - (gs)^2 + h_4(gs)^4 + h_6(gs)^6 + h_8(gs)^8\}$$

where reference symbol s represents a distance as measured from the optical axis to a portion of interest on said graded refractive index lens component, reference symbol $n(s)$ designates a refractive index of the portion located at the distance s as measured from the optical axis, and reference symbols g, $h_4$, $h_6$ and $h_8$ denote the refractive index distribution coefficients.

2. A zoom lens system according to claim 1, wherein said final lens unit satisfies the following condition:

$$0.1 < (b/n_b)/\{a + (b/n_b)\} < 0.61$$

where reference symbol a represents a thickness of airspace located on the object side of the concave diverging surface, reference symbol b designates a thickness of the positive lens component arranged facing in the direction of the image side, and reference symbol $n_b$ denotes the refractive index of said positive lens component.

3. A zoom lens system having a plurality of lens units arranged in order starting from an object side and including a first lens unit having a positive refractive power as a whole, a second lens unit having a negative lens unit as a whole, and a third lens unit having a positive refractive power as a hole, said third lens unit comprising:

a positive lens component arranged facing in the direction of the object side;

a lens component having a concave diverging surface facing the direction of the object side; and a positive lens component arranged facing in the direction of an image side, said zoom lens system being adaptable for modifying a focal length by moving said second lens unit along its optical axis, whereby the positive lens component arranged facing in the direction of the image side is designed as a graded refractive index lens component having its refractive index lowered at portions of said graded refractive lens component extending away from its optical axis, said graded refractive index lens component satisfying the following conditions (1) and (2):

$$h_6/h_4 < -10 \qquad (1)$$

$$h_8/h_4 < 10^3 \qquad (2)$$

where reference symbols $h_4$, $h_6$ and $h_8$ represent refractive index distribution coefficients.

4. A zoom lens system according to claim 3 wherein said first lens unit is kept fixed and said third lens unit is moved along the optical axis for varying focal length of said zoom lens system.

5. A zoom lens system according to claim 3 wherein said third lens unit is kept fixed and said first lens unit is moved along the optical axis for varying focal length of said zoom lens system.

6. A zoom lens system according to claim 3, wherein said third lens unit satisfies the following condition:

$$0.1 < (b/n_b)/\{a+(b/n_b)\} < 0.61$$

where reference symbol a represents a thickness of airspace located on the object side of the concave diverging surface, reference symbol b designates a thickness of the positive lens component arranged facing in the direction of the image side, and reference symbol $n_b$ denotes the refractive index of said positive lens component.

7. A zoom lens system having a plurality of lens units arranged in order starting from an object side and including a first lens unit having a positive refractive power as a whole, a second lens unit having a negative refractive power as a whole, a third lens unit having a positive refractive power as a whole, and a fourth lens unit comprising:

a positive lens component arranged facing in the direction of the object side;

a lens component having a concave diverging surface facing the direction of the object side; and a positive lens component arranged facing in the direction of an image side, said zoom lens system being adaptable for modifying a focal length by moving said second lens unit and said third lens unit along its optical axis, whereby the positive lens component arranged facing in the direction of the image side is designed as a graded refractive index lens component having its refractive index lowered at portions of said graded refractive lens component extending away from its optical axis, said graded refractive index lens component satisfying the following conditions (1) and (2):

$$h_6/h_4 < -10 \qquad (1)$$

$$h_8/h_4 < 10^3 \qquad (2)$$

wherein the reference symbols $h_4$, $h_6$ and $h_8$ represent refractive index distribution coefficients.

8. A zoom lens system according to claim 7 wherein said first lens unit is kept fixed and said fourth lens unit is moved along the optical axis for varying focal length of said zoom lens system.

9. A zoom lens system according to claim 7 wherein said fourth lens unit is kept fixed and said first lens unit is moved along the optical axis for varying focal length of said zoom lens system.

10. A zoom lens system according to claim 1, 3 or 7, wherein said graded refractive index lens component further satisfies the following condition (3):

$$|\Delta n| < 0.05 \qquad (3)$$

where reference symbol $|\Delta n|$ represents a difference in refractive index between an end of the effective diameter of said graded refractive index lens component and a portion thereof located on the optical axis.

11. A zoom lens system according to claim 7, wherein said fourth lens unit satisfies the following condition:

$$0.1 < (b/n_b)/\{a+(b/n_b)\} < 0.61$$

where reference symbol a represents a thickness of airspace located on the object side of the concave diverging surface, reference symbol b designates a thickness of the positive lens component arranged facing in the direction of the image side, and reference symbol $n_b$ denotes the refractive index of said positive lens component.

12. A zoom lens system according to claim 1, 3 or 7, wherein said graded refractive index lens component satisfies the following condition:

$$1.55 < n_0 < 1.65$$

where reference symbol $n_0$ represents the refractive index of said graded refractive index lens component as measured on the optical axis.

13. A zoom lens system having a plurality of lens units movably adaptable to modify a focal length by varying the airspace reserved between said lens units, one of said lens units arranged facing in the direction of an image side comprising at lest one graded refractive index lens component having its refractive index lowered at portions of said graded refractive lens component extending away from its optical axis, said graded refractive index lens component satisfying the following conditions (1) and (2):

(1) $h_6/h_4 < -10$ (2) $h_8/h_4 < 10$ where reference symbols $h_4$, $h_6$ and $h_8$ represent refractive index distribution coefficients.

14. A zoom lens system according to claim 13, wherein said graded refractive index lens component is arranged facing in the direction of the image side.

15. A zoom lens system according to claim 13 or 14, wherein said plurality of lens units includes a first positive lens unit, a second negative lens unit and a third positive lens unit.

* * * * *

UNITED STATES PATENT AND TRADEMARK OFFICE
CERTIFICATE OF CORRECTION

PATENT NO. : 5,221,996

DATED : June 22, 1993

INVENTOR(S) : Juro KIKUCHI

It is certified that error appears in the above-identified patent and that said Letters Patent is hereby corrected as shown below:

In claim 3, line 25 thereof (column 13, line 24), please change "$h_8/h_4 < 10^3$" to --$h_8/h_4 > 10^3$--.

In claim 7, line 25 thereof (column 14, line 16), please change condition 2 from "$h_8/h_4 < 10^3$" to --$h_8/h_4 > 10^3$--.

In claim 13, line 12 thereof (column 15, line 3), please change condition 2 from "$h_8/h_4 < 10$" to --$h_8/h_4 > 10^3$--.

Signed and Sealed this

Fourteenth Day of June, 1994

BRUCE LEHMAN

*Attest:*

*Attesting Officer*       Commissioner of Patents and Trademarks